(12) United States Patent
Sui et al.

(10) Patent No.: US 10,851,308 B2
(45) Date of Patent: Dec. 1, 2020

(54) METHOD FOR RECOVERING CARBON FIBERS FROM COMPOSITE WASTE

(71) Applicant: The Boeing Company, Chicago, IL (US)

(72) Inventors: Gang Sui, Beijing (CN); Xiaoping Yang, Beijing (CN); Xin Jin, Beijing (CN); Zhu Ming, Beijing (CN); Tianyu Wu, Beijing (CN)

(73) Assignee: The Boeing Company, Chicago, IL (US)

( * ) Notice: Subject to any disclaimer, the term of this patent is extended or adjusted under 35 U.S.C. 154(b) by 317 days.

(21) Appl. No.: 16/092,565

(22) PCT Filed: Mar. 30, 2018

(86) PCT No.: PCT/US2018/025404
§ 371 (c)(1),
(2) Date: Oct. 10, 2018

(87) PCT Pub. No.: WO2018/183847
PCT Pub. Date: Oct. 4, 2018

(65) Prior Publication Data
US 2019/0127644 A1    May 2, 2019

(30) Foreign Application Priority Data
Apr. 1, 2017    (CN) .......................... 2017 1 0213263

(51) Int. Cl.
| | |
|---|---|
| *C10B 57/06* | (2006.01) |
| *C10B 53/07* | (2006.01) |
| *C01B 32/05* | (2017.01) |
| *B01J 27/053* | (2006.01) |
| *B01J 27/125* | (2006.01) |

(Continued)

(52) U.S. Cl.
CPC ............. *C10B 57/06* (2013.01); *B01J 27/053* (2013.01); *B01J 27/125* (2013.01); *B01J 27/138* (2013.01); *B01J 27/232* (2013.01); *B01J 35/026* (2013.01); *B08B 3/12* (2013.01); *C01B 32/05* (2017.08);
(Continued)

(58) Field of Classification Search
CPC ......... C10B 57/06; C10B 53/07; C01B 32/05; B01J 27/053; B01J 27/125; B01J 27/138; B01J 27/232; B01J 35/026; B08B 3/12; D01F 9/12; Y02P 20/143; C08J 11/00
See application file for complete search history.

(56) References Cited

U.S. PATENT DOCUMENTS

2016/0039118 A1    2/2016   Gehr

FOREIGN PATENT DOCUMENTS

| | | |
|---|---|---|
| CN | 101928406 | 12/2010 |
| CN | 103665427 | 3/2014 |
| JP | 2004091719 | 3/2004 |

OTHER PUBLICATIONS

Wu, et al., Efficient reclamation of carbon fibers from epoxy composite waste through catalytic pyrolysis in molten ZnCl2, RSC Advances 2019; 9: 377-388 (Year: 2019).*

(Continued)

*Primary Examiner* — Daniel C. McCracken
(74) *Attorney, Agent, or Firm* — Walters & Wasylyna LLC

(57) ABSTRACT

A method for recovering carbon fibers from composite waste includes coating a water-soluble catalyst powder on a surface of composite waste having carbon fibers and a resin matrix and pyrolyzing the resin matrix of the coated composite waste.

20 Claims, 6 Drawing Sheets

(51) Int. Cl.
*B01J 27/138* (2006.01)
*B01J 27/232* (2006.01)
*B01J 35/02* (2006.01)
*B08B 3/12* (2006.01)
*D01F 9/12* (2006.01)

(52) U.S. Cl.
CPC ............... *C10B 53/07* (2013.01); *D01F 9/12* (2013.01); *Y02P 20/143* (2015.11)

(56) References Cited

OTHER PUBLICATIONS

European Patent Office, "Communication pursuant to Article 94(3) EPC," App. No. 18 719 003.8 (dated Nov. 22, 2019).
European Patent Office, "International Search Report" for International App. No. PCT/US2018/025404 (dated Jun. 13, 2018).
European Patent Office, "Communication pursuant to Article 94(3) EPC," App. No. 18 719 003.8 (dated Mar. 21, 2019).
European Patent Office, "Communication pursuant to Article 94(3) EPC," App. No. 18 719 003.8 (dated Jul. 18, 2019).

* cited by examiner

METHOD FOR RECOVERING CARBON FIBERS FROM COMPOSITE WASTE

PRIORITY

This application is a U.S. national phase application of Intl. App. No. PCT/US2018/025404 filed on Mar. 30, 2018, which claims priority from Chinese Patent Application No. 201710213263.4 titled "A Method for Recycling Carbon Fibers from Composite Material Wastes by Catalytic Pyrolysis," which was filed on Apr. 1, 2017.

FIELD

The present description belongs to the field of carbon fiber recycling, particularly relating to methods for recovering carbon fibers from composite waste, more particularly relating to methods for recovering carbon fibers from composite waste by catalytic pyrolysis.

BACKGROUND

Carbon fiber-reinforced resin composites have excellent properties such as high specific strength, high specific modulus, heat resistance, and corrosion resistance, and are therefore widely used in fields of aviation, aerospace, energy sources, transportation, and high-end sports equipment.

There is a problem in the treatment of waste carbon fiber-reinforced resin composites such as leftover materials produced in the manufacturing and end of service stage. Currently, carbon fiber-reinforced resin composites as solid waste are treated by way of milling into powder or particles and used as fillers for paving materials, etc., or even landfilled. Carbon fiber-reinforced resin composites contain high-value carbon fibers, and these treatment methods cause a tremendous waste of carbon fiber resources.

There have been various related art methods for decomposing carbon fiber-reinforced resin composite waste and separating carbon fibers so as to achieve recovery of the carbon fibers. These related art methods include inorganic strong acid decomposition, organic solvent decomposition, sub/supercritical fluid decomposition, and thermal decomposition.

In the recovery process of the inorganic strong acid decomposition and the organic solvent decomposition, a substantial amount of solvents are used, which may cause pollution to the environment. Furthermore, the operation process of separating (such as by liquid separation, extraction, distillation) the used solvents is complex, causing a higher recovery cost.

Although the supercritical water treatment method has characteristics of being clean and pollution-free, it needs to be carried out under high temperature and high pressure reaction conditions, and has higher requirements on reaction equipment.

Among related methods for recycling carbon fiber-reinforced resin composite waste, the most industrially feasible method is thermal decomposition, including the fluidized bed method and the pyrolysis method.

The fluidized bed method includes placing carbon fiber-reinforced resin composite waste in hot air for decomposition. However, the recovered carbon fibers are significantly oxidized, and the carbon fibers move and clash violently in a reactor, a separator or else. Consequently, there are a great number of grooves on the surface of the recovered carbon fibers, the length of the fibers is shortened, and the fiber properties are remarkably reduced. Furthermore, the fluidized bed method is complicated to operate.

A traditional thermal decomposition is to place carbon fiber-reinforced resin composite waste in an atmosphere of inert gas such as nitrogen and helium. The process operation is simple. However, there is a great amount of residual carbon formed on the surface of the recovered carbon fibers, or over oxidation on the surface of the carbon fibers due to high operating temperature, and all of these result in a remarkable reduction of the properties of the recovered carbon fibers, and significantly affect the subsequent application of the recovered carbon fibers and the value of recycled fibers thereof.

SUMMARY

In one embodiment, a method for recovering carbon fibers from composite waste includes coating a water-soluble catalyst powder on a surface of composite waste having carbon fibers and a resin matrix, and pyrolyzing the resin matrix of the coated composite waste.

In another embodiment, a method for recovering carbon fibers from composite waste includes spraying a water-soluble catalyst powder on a surface of composite waste having carbon fibers and a resin matrix with an amount of 0.1-0.5 g/cm$^2$, and putting the catalyst covered composite waste into a pyrolysis device and heating the catalyst covered composite waste to 250 to 450° C. for 10 to 30 minutes.

Other embodiments of the disclosed method for recovering carbon fibers will become apparent from the following detailed description, the accompanying drawings and the appended claims.

DETAILED DESCRIPTION

Figure 1:
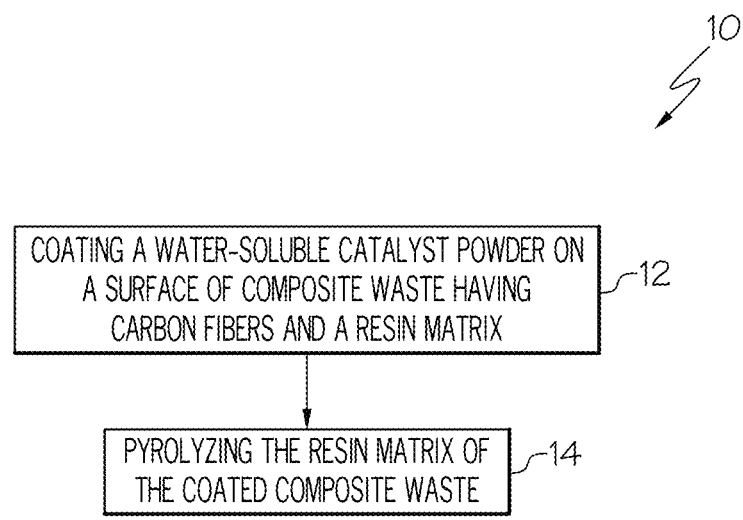
FIG. 1 is a flow chart illustrating a method for recovering carbon fibers from composite waste according to one embodiment.

As shown in FIG. 1, an embodiment of the present description relates to a method for recovering carbon fibers from composite waste, represented by flowchart 10. The method includes coating a water-soluble catalyst powder on a surface of composite waste having carbon fibers and a resin matrix, represented by block 12, and pyrolyzing the resin matrix of the coated composite waste, represented by block 14.

In an aspect, the method includes the following steps: (1) evenly spraying the water-soluble catalyst powder on the surface of the composite material waste with an amount of 0.1-0.5 g/cm$^2$; and (2) putting the catalyst covered composite material waste into a pyrolysis device and heat the materials to 270-450° C. for 10-30 minutes. A pyrolysis reaction occurs in the resin matrix of the composite during this time. Then, the heating is stopped and the pyrolyzed waste is naturally cooled to room temperature, and the recovered fibers are taken out of the pyrolysis device and cleaned with deionized water using ultrasonic.

Compared with existing technologies, the method of the present description decreases the pyrolytic temperature by 50-100° C. and reduces the degradation time by no less than 10 min due to the addition of catalyst. Therefore, the energy consumption is reduced during the pyrolysis process. Additionally, the catalyst dissolved in water after ultrasonic cleaning can be recycled. The recycling efficiency of the carbon fibers in the present description is very high and the retention ratio of monofilament tensile strength can reach 95%. The operation process is simple, so it is suitable for industrial production.

In an aspect, the catalyst is a solid powder at room temperature, the melting point is between 250 and 400° C., and the chemical properties are stable. The catalyst may consist of a main catalyst and sodium bicarbonate, wherein the main catalyst is preferably zinc chloride, sodium tetrachloroaluminate, zinc sulfate, or a mixture thereof composed in a certain ratio, and wherein the sodium bicarbonate as an auxiliary reagent is decomposed to produce carbon dioxide and water during the heating process, which facilitates the catalysis effect of the main catalyst on the pyrolysis reaction occurring in the resin matrix of the composite waste.

In an aspect, the matrix resin in said composite material waste is epoxy resin, or the epoxy resin may be replaced with a thermosetting resin such as unsaturated polyester, phenolic resin or thermoplastic resin such as polyolefin, nylon, or polyester.

In an aspect, the carbon fibers in the composite material waste are polyacrylonitrile-based carbon fibers, or the polyacrylonitrile-based carbon fibers may be replaced with asphalt-based carbon fibers.

In an aspect, the carbon fibers in the composite material waste have a morphology of continuous fibers, or the continuous fibers may be replaced with long fibers, short fibers, powdered fibers, or carbon fiber fabrics.

In an aspect, the catalyst becomes a molten state as liquid film adhering to the surface of the carbon fiber composite at a certain temperature, facilitating the degradation of the resin matrix.

In an aspect, the recovered carbon fibers are subjected to ultrasonic cleaning in water to obtain carbon fibers with a clean surface and a structural integrity In an aspect, the catalyst can be recycled from the aqueous solution, and the recovered carbon fibers are not oxidized, which has a high retention ratio of mechanical properties, and is good for future applications.

The objective of the present description is to provide a method capable of achieving the effective separation and recovery of high-performance carbon fibers from carbon fiber-reinforced resin composite waste, so as to increase the recovery efficiency, reduce the energy consumption and cost in the recovery process, and achieve resource savings and low impact on environment.

The essence of the present description lies in reducing the temperature and time of the pyrolysis of the resin matrix in waste carbon fiber composites by catalyst addition. The catalyst forms a liquid film on the surface of the waste composites and permeates into the material, so that the temperature and time of the decomposition of the resin matrix are reduced. A small amount of the resin matrix degradation product is combined with the catalyst and cooled to form a solid, and after ultrasonic cleaning with deionized water, carbon fibers with a clean surface and a structural integrity can be obtained. The mass recovery rate of the obtained carbon fibers in the present description is very high and the retention ratio of monofilament tensile strength can reach 95%, which is advantageous for various subsequent applications.

Preferably, the catalyst is solid powder at room temperature, the melting point is between 250 and 400° C., and the chemical properties are stable. The catalyst consists of main catalyst and sodium bicarbonate. The main catalyst is preferably zinc chloride, sodium tetrachloroaluminate, zinc sulfate, or a mixture thereof in a certain ratio. The sodium bicarbonate as an auxiliary reagent is decomposed to produce carbon dioxide and water in the temperature increase process, which can facilitate the catalysis effect of the main catalyst on the pyrolysis reaction occurring to the resin matrix of the composite. The mixture of the main catalyst and the sodium bicarbonate is evenly sprayed on the surface of the material in an amount of 0.1-0.5 g/cm$^2$.

Preferably, said pyrolysis reaction temperature is 250-450° C. According to TGA test, the resin matrix can be fully degraded at 450° C. in air atmosphere, and the carbon fibers can hardly be oxidized, so that the properties of the recycled carbon fibers can be retained very well. If the temperature is higher than 450° C., the carbon fibers surface will be oxidized which leads to bad performance. When the temperature is lower than 250° C., the rate of the resin degradation is low, even the degradation of resin could be incomplete, which will increase the treatment time and cost, or cannot get clean recycled fibers.

Figure 2:
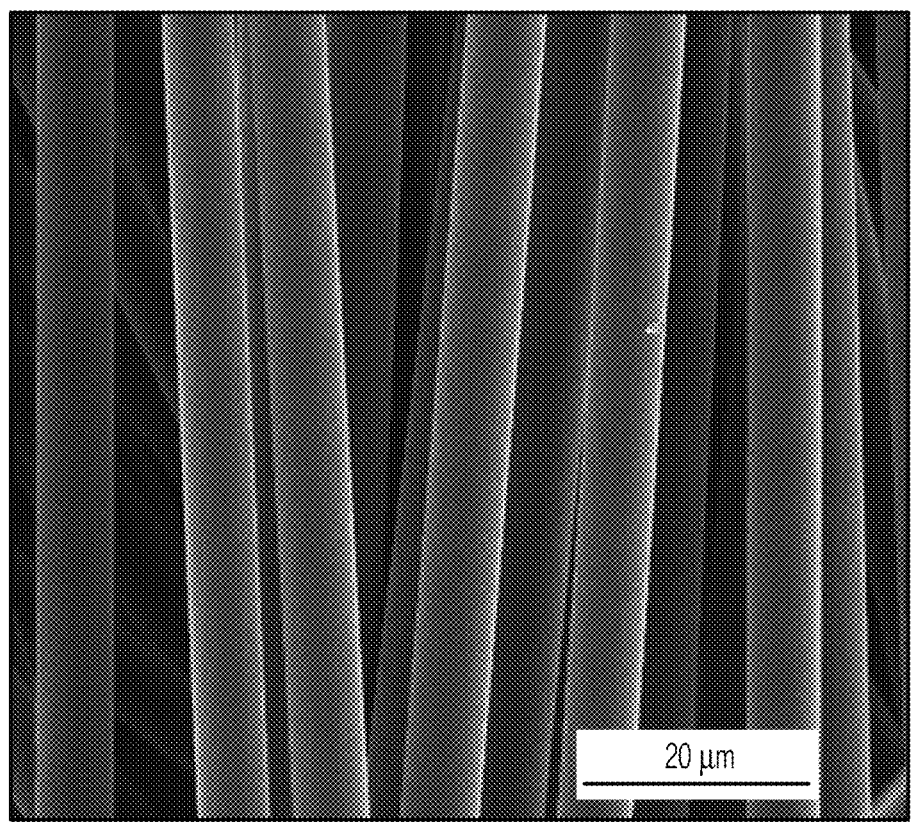
FIG. 2 is an SEM photograph of carbon fibers recovered by pyrolysis with addition of catalyst.
Figure 3:
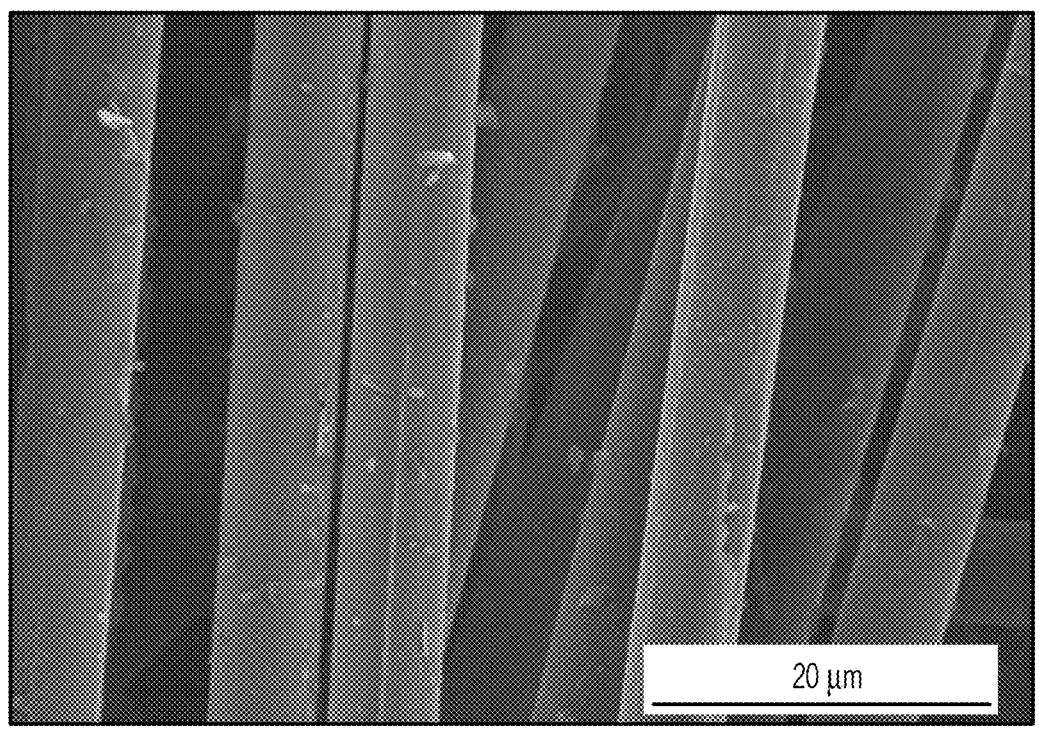
FIG. 3 is an SEM photograph of carbon fibers recovered by pyrolysis without addition of catalyst.
Figure 4:
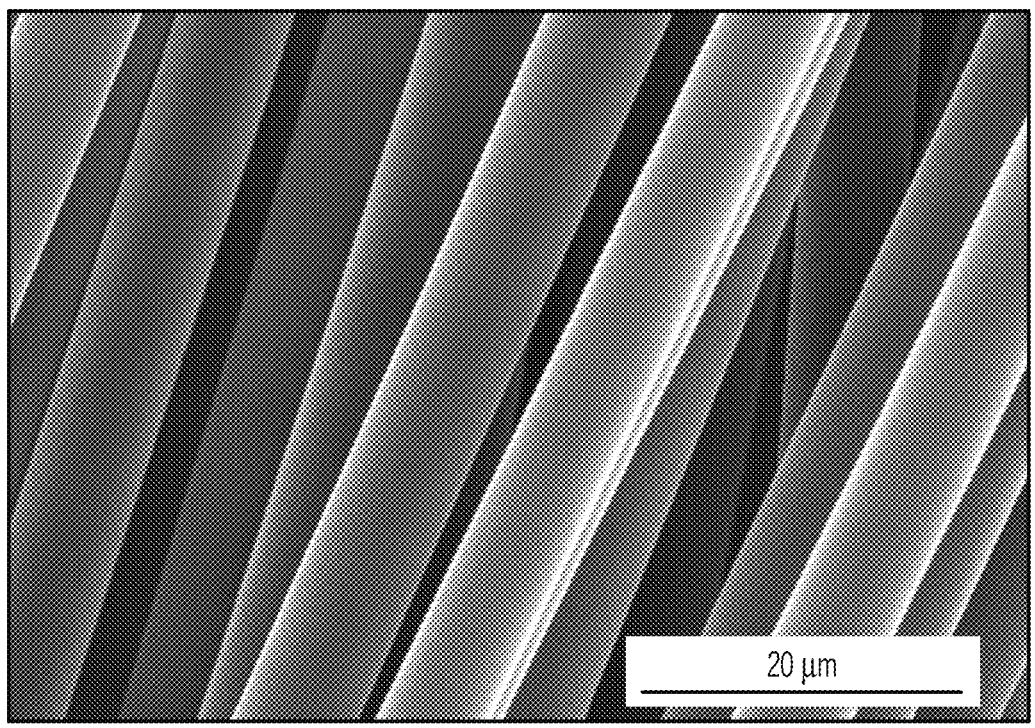
FIG. 4 is an SEM photograph of virgin commercial carbon fibers.
Figure 5:
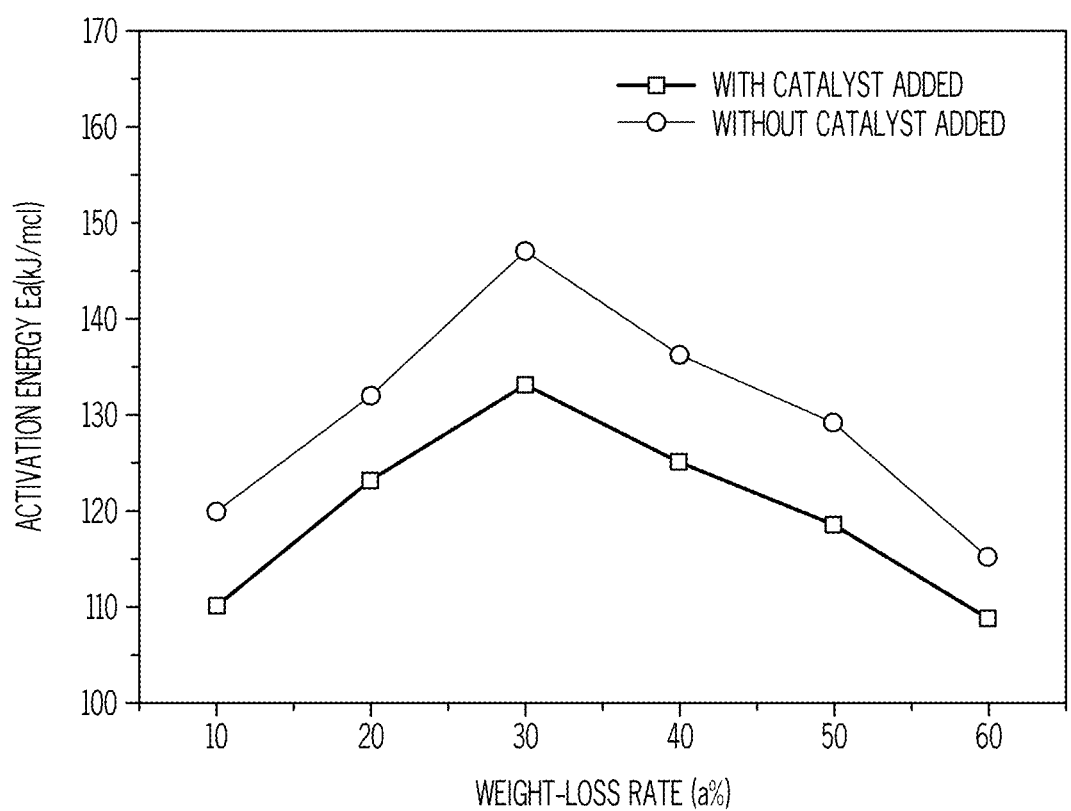
FIG. 5 is a graph showing that a decrease of the pyrolysis reaction activation energy with addition of the catalyst can reach 10 kJ/mol; thereby, the pyrolysis temperature and time are reduced, the energy sources are saved.

As compared to the prior art, the method in the present description has the following advantages: firstly, the equipment is simple, the technological process is facile, and the treatment cost is low. And secondly, the present description not only can achieve fully decomposition of the resin matrix in the composite waste (SEM photographs of carbon fibers recovered by pyrolysis with addition of catalyst, carbon fibers recovered by pyrolysis without addition of the catalyst, and virgin commercial carbon fiber shown in FIGS. 2, 3 and 4), but also reduces the activation energy required for thermal degradation of the resin matrix (as shown in FIG. 4) wherein the decrease of the pyrolysis reaction activation energy with addition of the catalyst can reach 10 kJ/mol; thereby, the pyrolysis temperature and time are reduced, the energy sources are saved. The catalyst can also be recycled, and the feasibility of recycling carbon fibers is greatly improved. Therefore, the present description has advantages such as high efficiency, low cost, and being industrially applicable.

The present description is described in further detail in conjunction with particular embodiments below.

Example 1

In a chosen carbon fiber composite waste, the carbon fibers are Toray T700, the resin matrix is 4,4'-diaminodiphenylmethane epoxy resin, and the curing agent is diaminodiphenyl sulfone, wherein the carbon fibers have a mass fraction of 65%, a 2 mm thick carbon fiber composite plate is cut into about 25 cm$^2$, placed in a square crucible, then placed in a pyrolysis furnace and heated to 450° C., so that the resin matrix in the composite undergoes a pyrolysis reaction at this temperature, the heating is stopped after 20 min, the material is naturally cooled to room temperature, a product is taken out, and then the product is placed in deionized water, subjected to ultrasonic cleaning for 10 min, and dried to obtain recovered carbon fibers. According to standard ASTM-D 3379, the carbon fibers are subjected to a monofilament tensile test, and the monofilament tensile strength is 4.05 GPa. The tensile strength retention rate is 82.7% with respect to that of the commercial T700 carbon fiber monofilaments.

For the same carbon fiber composite sample, the catalyst is evenly sprayed on the surface thereof, the mass ratio of zinc chloride to sodium tetrachloroaluminate to zinc sulfate to sodium bicarbonate in the catalyst being 75:5:10:10, the amount of the catalyst being 0.1 g/cm$^2$. Then, the sample is placed in a pyrolysis furnace and heated to 270° C., so that the resin matrix in the carbon fiber composite undergoes a pyrolysis reaction at this temperature for 30 min, the material is naturally cooled to room temperature, a product is taken out, and then the product is placed in deionized water, subjected to ultrasonic cleaning, and dried to obtain recovered carbon fibers. According to standard ASTM-D 3379, the carbon fibers are subjected to a monofilament tensile test, and the monofilament tensile strength is 4.11 GPa. The tensile strength retention rate is 83.9% with respect to that of the commercial T700 carbon fiber monofilaments.

For the same carbon fiber composite sample, the catalyst is evenly sprayed on the surface thereof, the mass ratio of zinc chloride to sodium tetrachloroaluminate to zinc sulfate to sodium bicarbonate being 75:5:10:10, the amount of the catalyst being 0.1 g/cm$^2$, then, the sample is placed in a pyrolysis furnace and heated to 350° C., so that the resin matrix in the carbon fiber composite undergoes a pyrolysis reaction at this temperature for 20 min, the material is naturally cooled to room temperature, a product is taken out, and then the product is placed in deionized water, subjected to ultrasonic cleaning for 10 min, and dried to obtain recovered carbon fibers. According to standard ASTM-D 3379, the carbon fibers are subjected to a monofilament tensile test, and the monofilament tensile strength is 4.19 GPa. The tensile strength retention rate is 85.5% with respect to that of the commercial T700 carbon fiber monofilaments.

For the same carbon fiber composite sample, a catalyst is evenly sprayed on the surface thereof, the mass ratio of zinc chloride to sodium tetrachloroaluminate to zinc sulfate to sodium bicarbonate being 75:5:10:10, the amount of the catalyst being 0.1 g/cm$^2$, then, the sample is placed in a pyrolysis furnace and heated to 400° C., so that the resin matrix in the carbon fiber composite undergoes a pyrolysis reaction at this temperature for 10 min, the material is naturally cooled to room temperature, a product is taken out, and then the product is placed in deionized water, subjected to ultrasonic cleaning for 10 min, and dried to obtain recovered carbon fibers. According to standard ASTM-D 3379, the carbon fibers are subjected to a monofilament tensile test, and the monofilament tensile strength is 4.39 GPa. The tensile strength retention rate is 89.6% with respect to that of the commercial T700 carbon fiber monofilaments.

For the same carbon fiber composite sample, a catalyst is evenly sprayed on the surface thereof, the mass ratio of zinc chloride to sodium tetrachloroaluminate to zinc sulfate to sodium bicarbonate being 75:5:10:10, the amount of the catalyst being 0.1 g/cm$^2$, then, the sample is placed in a pyrolysis furnace and heated to 450° C., so that the resin matrix in the carbon fiber composite undergoes a pyrolysis reaction at this temperature for 10 min, the material is naturally cooled to room temperature, a product is taken out, and then the product is placed in deionized water, subjected to ultrasonic cleaning for 10 min, and dried to obtain recovered carbon fibers. According to standard ASTM-D 3379, the carbon fibers are subjected to a monofilament tensile test, and the monofilament tensile strength is 4.27 GPa. The tensile strength retention rate is 87.1% with respect to that of the commercial T700 carbon fiber monofilaments.

Example 2

In a chosen carbon fiber composite waste, the carbon fibers are Toray T700, the resin matrix is a 4,4'-diaminodiphenylmethane epoxy resin, and the curing agent is diaminodiphenyl sulfone, wherein the carbon fibers have a mass fraction of 65%, a 2 mm thick carbon fiber composite plate is cut into about 25 cm$^2$, placed in a square crucible, then placed in a pyrolysis furnace and heated to 400° C., so that the resin matrix in the carbon fiber resin composite undergoes a pyrolysis reaction, the heating is stopped after 30 min, the material is naturally cooled to room temperature, a product is taken out, and then the product is placed in deionized water, subjected to ultrasonic cleaning for 10 min, and dried to obtain recovered carbon fibers. According to standard ASTM-D 3379, the carbon fibers are subjected to a monofilament tensile test, and the monofilament tensile strength is 4.10 GPa. The tensile strength retention rate is 83.7% with respect to that of the commercial T700 carbon fiber monofilaments.

For the same carbon fiber composite sample, a catalyst is evenly sprayed on the surface thereof, the mass ratio of zinc chloride to sodium tetrachloroaluminate to zinc sulfate to sodium bicarbonate being 75:5:10:10, the amount of zinc chloride being 0.1 g/cm$^2$, then, the sample is placed in a pyrolysis furnace and heated to 400° C., so that the resin in the carbon fiber resin composite undergoes a pyrolysis reaction at this temperature for 20 min, the material is naturally cooled to room temperature, a product is taken out, and then the product is placed in deionized water, subjected to ultrasonic cleaning for 10 min, and dried to obtain recovered carbon fibers. According to standard ASTM-D 3379, the carbon fibers are subjected to a monofilament tensile test, and the monofilament tensile strength is 4.45 GPa. The tensile strength retention rate is 90.8% with respect to that of the commercial T700 carbon fiber monofilaments.

Example 3

In a chosen carbon fiber composite waste, the carbon fibers are Toray T700, the resin matrix is a 4,4'-diaminodiphenylmethane epoxy resin, and the curing agent is diaminodiphenyl sulfone, wherein the carbon fibers have a mass fraction of 65%, a 2 mm thick carbon fiber composite plate is cut into about 25 cm$^2$, placed in a square crucible of which the surface is layered with a catalyst with a mass ratio of zinc chloride to sodium tetrachloroaluminate to zinc sulfate to sodium bicarbonate of 75:5:10:10 and a catalyst amount of 0.1 g/cm$^2$, then placed in a pyrolysis furnace and heated to 400° C., so that the resin matrix in the carbon fiber resin composite undergoes a pyrolysis reaction, the heating is stopped after 10 min, the material is naturally cooled to room temperature, a product is taken out, and then the product is placed in deionized water, subjected to ultrasonic cleaning for 10 min, and dried to obtain recovered carbon fibers. According to standard ASTM-D 3379, the carbon fibers are subjected to a monofilament tensile test, and the monofilament tensile strength is 4.17 GPa. The tensile strength retention rate is 85.1% with respect to that of the commercial T700 carbon fiber monofilaments.

For the same carbon fiber composite sample, a catalyst is evenly sprayed on the surface thereof, the mass ratio of zinc chloride to sodium tetrachloroaluminate to zinc sulfate to sodium bicarbonate in the catalyst being 75:5:10:10, the amount of the catalyst being 0.3 g/cm$^2$, then, the sample is placed in a pyrolysis furnace and heated to 400° C., so that the resin in the carbon fiber resin composite undergoes a pyrolysis reaction at this temperature for 10 min, the heating is stopped, the material is naturally cooled to room temperature, thereafter a product is taken out, and then the product is placed in water, subjected to ultrasonic cleaning for 10 min, and dried to obtain recovered carbon fibers. According to standard ASTM-D 3379, the carbon fibers are subjected to a monofilament tensile test, and the monofilament tensile strength is 4.49 GPa. The tensile strength retention rate is 91.6% with respect to that of the commercial T700 carbon fiber monofilaments.

Example 4

In a chosen carbon fiber composite waste, the carbon fibers are Toray T700, the resin matrix is a 4,4'-diaminodiphenylmethane epoxy resin, and the curing agent is diaminodiphenyl sulfone, wherein the carbon fibers have a mass fraction of 65%, a 2 mm thick carbon fiber composite plate is cut into about 25 cm$^2$, placed in a square crucible of which the surface is evenly sprayed with a catalyst with a mass ratio of zinc chloride to sodium tetrachloroaluminate to zinc sulfate to sodium bicarbonate of 80:20:0:0 and a catalyst amount of 0.5 g/cm$^2$, then placed in a pyrolysis furnace and heated to 400° C., so that the resin in the carbon fiber resin composite undergoes a pyrolysis reaction at this temperature for 10 min, the heating is stopped, the material is naturally cooled to room temperature, thereafter a product is taken out, and then the product is placed in water, subjected to ultrasonic cleaning for 10 min, and dried to obtain recovered carbon fibers. According to standard ASTM-D 3379, the carbon fibers are subjected to a monofilament tensile test, and the monofilament tensile strength is 4.50 GPa. The tensile strength retention rate is 91.8% with respect to that of the commercial T700 carbon fiber monofilaments.

Example 5

In a chosen carbon fiber composite waste, the carbon fibers are Toray T700, the resin matrix is a 4,4'-diaminodiphenylmethane epoxy resin, and the curing agent is diaminodiphenyl sulfone, wherein the carbon fibers have a mass fraction of 65%, a 2 mm thick carbon fiber composite plate is cut into about 25 cm$^2$, placed in a square crucible of which the surface is evenly sprayed with a catalyst with a mass ratio of zinc chloride to sodium tetrachloroaluminate to zinc sulfate to sodium bicarbonate of 100:0:0:0 and a catalyst amount of 0.3 g/cm$^2$, then placed in a pyrolysis furnace and heated to 400° C., so that the resin in the carbon fiber resin composite undergoes a pyrolysis reaction at this temperature for 20 min, the heating is stopped, the material is naturally cooled to room temperature, thereafter a product is taken out, and then the product is placed in water, subjected to ultrasonic cleaning for 10 min, and dried to obtain recovered carbon fibers. According to standard ASTM-D 3379, the carbon fibers are subjected to a monofilament tensile test, and the monofilament tensile strength is 4.36 GPa. The tensile strength retention rate is 89.0% with respect to that of the commercial T700 carbon fiber monofilaments.

Example 6

In a chosen carbon fiber composite waste, the carbon fibers are Toray T700, the resin matrix is a 4,4'-diaminodiphenylmethane epoxy resin, and the curing agent is diaminodiphenyl sulfone, wherein the carbon fibers have a mass fraction of 65%, a 2 mm thick carbon fiber composite plate is cut into about 25 cm$^2$, placed in a square crucible of which the surface is evenly sprayed with a catalyst with a mass ratio of zinc chloride to sodium tetrachloroaluminate to zinc sulfate to sodium bicarbonate of 75:5:10:10 and a catalyst amount of 0.3 g/cm$^2$, then placed in a pyrolysis furnace and heated to 400° C., so that the resin in the carbon fiber resin composite undergoes a pyrolysis reaction at this temperature for 20 min, the heating is stopped, the material is naturally cooled to room temperature, thereafter a product is taken out, and then the product is placed in water, subjected to ultrasonic cleaning for 10 min, and dried to obtain recovered carbon fibers. According to standard ASTM-D 3379, the carbon fibers are subjected to a monofilament tensile test, and the monofilament tensile strength is 4.56 GPa. The tensile strength retention rate is 93.1% with respect to that of the commercial T700 carbon fiber monofilaments.

Example 7

In a chosen carbon fiber composite waste, the carbon fibers are Toray T700, the resin matrix is a 4,4'-diaminodiphenylmethane epoxy resin, and the curing agent is diaminodiphenyl sulfone, wherein the carbon fibers have a mass fraction of 65%, a 2 mm thick carbon fiber composite plate is cut into about 25 cm$^2$, placed in a square crucible of which the surface is evenly sprayed with a catalyst with a mass ratio of zinc chloride to sodium tetrachloroaluminate to zinc sulfate to sodium bicarbonate of 75:5:10:10 and a catalyst amount of 0.3 g/cm$^2$, then placed in a pyrolysis furnace and heated to 400° C., so that the resin in the carbon fiber resin composite undergoes a pyrolysis reaction at this temperature for 30 min, the heating is stopped, the material is naturally cooled to room temperature, thereafter a product is taken out, and then the product is placed in water, subjected to ultrasonic cleaning for 10 min, and dried to obtain recovered carbon fibers. According to standard ASTM-D 3379, the carbon fibers are subjected to a monofilament tensile test, and the monofilament tensile strength is 4.66 GPa. The tensile strength retention rate is 95.1% with respect to that of the commercial T700 carbon fiber monofilaments.

Figure 6:
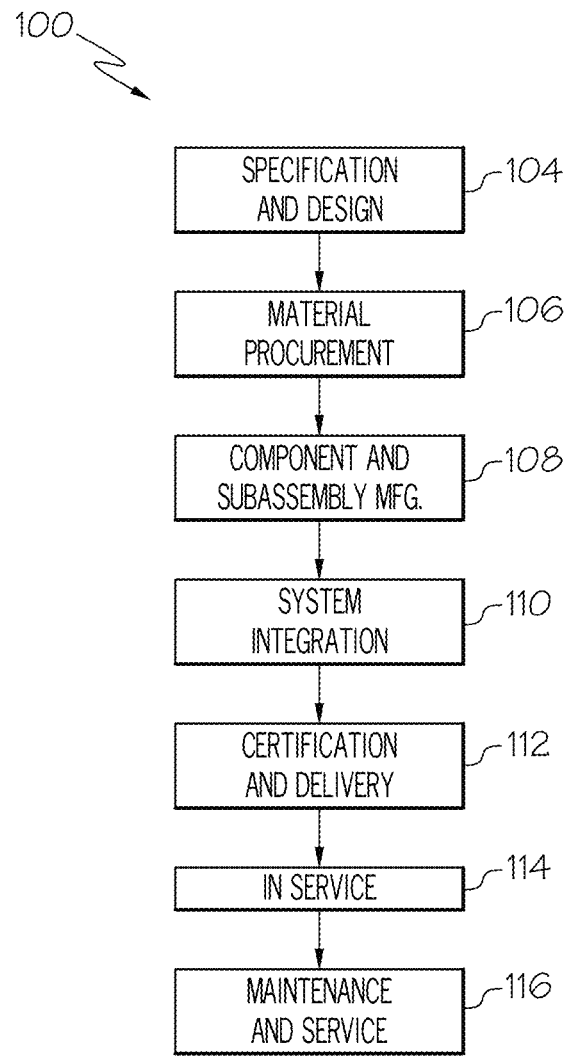
FIG. 6 is flow diagram of an aircraft manufacturing and service methodology.
Figure 7:
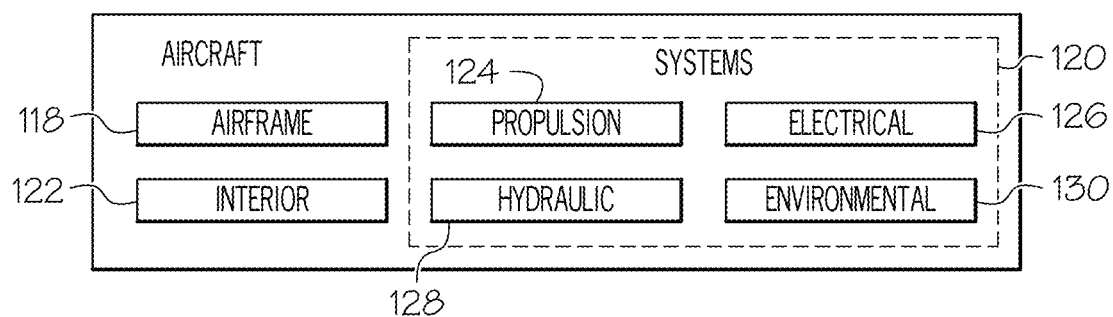
FIG. 7 is a block diagram of an aircraft.

Examples of the present description may be described in the context of an aircraft manufacturing and service method 100, as shown in FIG. 6, and an aircraft 102, as shown in FIG. 7. During pre-production, the aircraft manufacturing and service method 100 may include specification and design 104 of the aircraft 102 and material procurement 106. During production, component/subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116, which may also include modification, reconfiguration, refurbishment and the like.

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

The disclosed methods may be employed during any one or more of the stages of the aircraft manufacturing and service method 100, particular during material procurement 106, component/subassembly manufacturing 108, system integration 110, and routine maintenance and service 116.

As shown in FIG. 7, the aircraft 102 produced by example method 100 may include an airframe 118 with a plurality of systems 120 and an interior 122. Examples of the plurality of systems 120 may include one or more of a propulsion system 124, an electrical system 126, a hydraulic system 128, and an environmental system 130. Any number of other systems may be included. The disclosed methods may be employed for any of the systems of the aircraft 902, particularly including any of the system in which carbon fiber containing materials are used. Additionally, the disclosed methods may be employed after retirement of an aircraft 102 from service.

The disclosed methods are described in the context of an aircraft; however, one of ordinary skill in the art will readily recognize that the disclosed methods may be utilized for a variety of vehicles and non-vehicles. For example, implementations of the embodiments described herein may be implemented in any type of vehicle including, e.g., helicopters, passenger ships, and automobiles or in any type of non-vehicle, e.g., sporting goods, construction goods and communication products.

Although various embodiments of the disclosed methods have been shown and described, modifications may occur to those skilled in the art upon reading the specification. The present application includes such modifications and is limited only by the scope of the claims.

What is claimed is:

1. A method for recovering carbon fibers from composite waste, the method comprising:
   coating a water-soluble catalyst powder on a surface of composite waste having carbon fibers and a resin matrix; and
   pyrolyzing the resin matrix of the coated composite waste.

2. The method of claim 1 wherein the step of coating includes spraying the water-soluble catalyst powder on the surface of the composite waste with an amount of 0.1-0.5 $g/cm^2$.

3. The method of claim 1 wherein the step of pyrolyzing includes putting the coated composite waste into a pyrolysis device.

4. The method of claim 1 wherein the step of pyrolyzing includes heating to 250 to 450° C. for 10 to 30 minutes.

5. The method of claim 4 further comprising stopping the heating and naturally cooling to room temperature.

6. The method of claim 1 wherein the catalyst is a solid powder at room temperature, has a melting point between 250° C. and 400° C., and has stable chemical properties.

7. The method of claim 1 wherein the catalyst includes a main catalyst and sodium bicarbonate.

8. The method of claim 7 wherein the main catalyst includes zinc chloride, sodium tetrachloroaluminate, zinc sulfate, or a mixture thereof.

9. The method of claim 1 wherein the resin matrix includes a thermosetting resin.

10. The method of claim 9 wherein the thermosetting resin includes at least one of epoxy resin, unsaturated polyester, and phenolic resin.

11. The method of claim 1 wherein the resin matrix includes a thermoplastic resin.

12. The method of claim 11 wherein the thermoplastic resin includes at least one of polyolefin, nylon, and polyester.

13. The method of claim 1 wherein the carbon fibers include at least one of polyacrylonitrile-based carbon fibers and asphalt-based carbon fibers.

14. The method of claim 1 wherein a morphology of the carbon fibers includes at least one of continuous fibers, long fibers, short fibers, powdered fibers and carbon fiber fabrics.

15. The method of claim 1 wherein the catalyst becomes a molten state as liquid film adhering to a surface of the composite waste, thereby facilitating a degradation of the resin matrix.

16. The method of claim 1 further comprising subjecting recovered carbon fibers to ultrasonic cleaning in water to obtain carbon fibers with a clean surface.

17. A method for recovering carbon fibers from composite waste, the method comprising:
   spraying a water-soluble catalyst powder on a surface of composite waste having carbon fibers and a resin matrix with an amount of 0.1-0.5 $g/cm^2$; and
   putting the catalyst covered composite waste into a pyrolysis device and heating the catalyst covered composite waste to 250 to 450° C. for 10 to 30 minutes.

18. The method of claim 17 further comprising stopping the heating and naturally cooling to room temperature.

19. The method of claim 18 further comprising taking the carbon fibers out of the pyrolysis device and ultrasonic cleaning the carbon fibers in water to obtain carbon fibers with a clean surface.

20. The method of claim 17 wherein the catalyst is a solid powder at room temperature, has a melting point between 250° C. and 400° C., and has stable chemical properties.

* * * * *